(12) United States Patent
O'Hanlon

(10) Patent No.: US 7,643,821 B2
(45) Date of Patent: Jan. 5, 2010

(54) TEXT BROCHURE AND MEDIA SYSTEM AND METHOD

(75) Inventor: Kenneth P. O'Hanlon, Denver, CO (US)

(73) Assignee: Access U2 Mobile Solutions, LLC, Denver, CO (US)

( * ) Notice: Subject to any disclaimer, the term of this patent is extended or adjusted under 35 U.S.C. 154(b) by 565 days.

(21) Appl. No.: 11/303,499

(22) Filed: Dec. 17, 2005

(65) Prior Publication Data
US 2007/0141977 A1    Jun. 21, 2007

(51) Int. Cl.
*H04M 3/42*    (2006.01)
(52) U.S. Cl. .............................. 455/414.1; 455/14
(58) Field of Classification Search ............ 455/414, 455/466, 412; 705/34, 40, 14, 15
See application file for complete search history.

(56) References Cited

U.S. PATENT DOCUMENTS

| 5,867,780 | A * | 2/1999 | Malackowski et al. | ...... 455/415 |
| 2006/0047568 | A1 * | 3/2006 | Eisenberg et al. | ............. 705/14 |
| 2006/0149644 | A1 * | 7/2006 | Sulmar et al. | ................. 705/34 |
| 2006/0217135 | A1 * | 9/2006 | Moore et al. | ................ 455/466 |

* cited by examiner

*Primary Examiner*—Tu X Nguyen
(74) *Attorney, Agent, or Firm*—Craig W. Barber; Marian J. Furst

(57) ABSTRACT

A method and device for providing brochures to interested parties using cellular communication devices such as cellular telephones, cellular enabled digital devices and the like. An access number which may be contacted by a cellular communication device is provided in an advertisement of an item, the access number being a short code, telephone number or the like. An active seeker device continuously receives messages sent to the access number, then a database of information is consulted and an informational message sent to the caller. The informational message may be an SMS text message, a photograph of the item, an opt-in message to receive further information, and combinations thereof. Items may include any object or estate commonly advertised for sale or lease, such as real estate, vehicles, consumer products and the like.

17 Claims, 5 Drawing Sheets

TEXT BROCHURE AND MEDIA SYSTEM AND METHOD

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

CROSS-REFERENCE TO RELATED APPLICATIONS

N/A

FIELD OF THE INVENTION

This invention relates generally to telecommunication devices, and specifically to the timely provision of text brochures and media brochures to potential buyers of an advertised product.

STATEMENT REGARDING FEDERALLY FUNDED RESEARCH

This invention was not made under contract with an agency of the US Government, nor by any agency of the US Government.

BACKGROUND OF THE INVENTION

Sellers, buyers, and lessors of property are familiar with the difficulty of getting text brochures describing an item for sale or rent into the hands of the interested potential buyer. One common solution is the box having a number of brochures or flyers within it. Real estate is the area in which this device frequently appears: a home for sale may well have a "FOR SALE" yard sign, with or without a rider (a smaller sign attached to the main sign), and a box or tube which is supposed to contain flyers for interested parties to take when they notice the house. The problems with this system are numerous, the single most important problem being that the box is empty more often than it contains flyers. Replenishing the boxes of flyers is a hit or miss business at best and is time intensive, even if passers by and potential buyers take only one flyer each.

It would be advantageous to provide a system by which a potential buyer may see a text brochure on a property quickly without these disadvantages. Various solutions have been considered for this.

One potential solution is the replacement of the original flyer box with a recorded audio message, which may be broadcast by low power radio or made available to those calling a certain number. One disadvantage of such a system is that there is no possibilities of putting the facts actually in the hands of the potential buyer, a larger disadvantage in terms of sales psychology is that people like to see photographs of the item they are interested in buying. A different potential solution is the 'fax back' in which an interested party places a call and an automatic system sends a fax in response. The disadvantage of this system is that the interested party is most interested at the moment they actually are at the home, vehicle, etc, or the moment when they see the advertisement of that item, and there is little chance that the typical individual will be able to immediately receive a fax as a result.

It would be preferable if text and images of an item for sale or lease (such as a home) could be distributed immediately to interested parties, without the requirement of a fax machine or the like.

One possible response, recently invented by the individual also named as inventor of the present invention, is the SMS text message response system. Such systems use an SMS text message access number on a real estate "rider" type sign (a small sign placed on top of a yard sign) to make potential buyers aware that they may receive in reply an SMS text message. Two examples of this earlier invention (being used in the marketplace beginning in 2005 and no earlier) may be found at www.phoneflyer.com and www.house4cell.com. Both of these have pioneered within the period of months prior to the present application, and in the earlier case, shortly after the inventor explained the system to the individual who then set up the Phoneflyer (tm) system.

These systems still have certain difficulties, however. First and foremost is the fact that numerous potential home buyers, vehicle buyers, and other buyers will not voluntarily send or do not know how to send an SMS text message, for reasons such as the irritation of pushing telephone buttons multiple times in order to get the desired letter of the alphabet of a single word of a message. In addition to that fact, while these systems claim that a reply may be received in "seconds", in point of fact this is not the nature of SMS text messaging. In normal use, SMS messages receive a lower priority of handling from telecommunication providers than do voice communications, so SMS messages may enter a queue rather than being sent directly to the intended recipient. Multiplied by a factor of two (once for the SMS message requesting information and once for the return message) the result is that the interested party may have to wait for hours prior to receiving their response message, if they even bother to text message out the desire for a text brochure, media brochure or the like.

Thus it would be advantageous to provide a system by which a user may receive a response in seconds rather minutes or hours and with a high degree of certitude.

It would further be advantageous to provide a system by which a user may request the text brochure of information about the sale item without the necessity of sending an original text message requesting the text brochure.

It would further be advantageous to provide a system by which a database of potential buyer information or a "prospect database" may be created and accessed.

It would be further be advantageous to provide access to properties for sale, including views of the item not normally visible to a casual observes, such as interior view of buildings or vehicles.

It would further be advantageous to provide a system by which a consumer user can opt in to receive similar text/media brochures on similar items for sale or lease.

It would further be advantageous to increase the probability of successful completion of a customer contact by not relying exclusively on SMS protocols.

SUMMARY OF THE INVENTION

General Summary

The present invention teaches a method and device for providing text brochures to interested parties using cellular communication devices such as cellular telephones, cellular enabled digital devices such as PDAs, computers, games and the like.

An access number which may be contacted by a cellular communication device is provided in an advertisement of an item, the access number being a short code, telephone number or the like. To receive a text brochure, the user will communicate with the access number by telephone call or message, where they may be handled by a DTMF code response system, an interactive voice response system, a message parser or the like. In the past, this step of the process would have resulted in unacceptable delays. However, the invention teaches that an active seeker device continuously receives HTTP transactions sent to the access number, thus cutting out one part of the previous long delay before receipt of a message.

A digital device such as a server then consults a database of information and generates an informational message that is sent to the caller. The informational message may be an SMS text message such as a text brochure, a photograph of the item (in an MMS application), a link to an image or other media relating to an item, video, audio, etc, (in WAP applications) an opt-in message to receive further information, and combinations thereof, all by formats now known or later developed.

Items may include any object or estate commonly advertised for sale or lease, such as real estate (homes, condominiums, apartments, rooms, commercial real estate, lots and so on), vehicles (cars, boats, airplanes, RVs and so on), consumer products (sporting equipment, electronic equipment, appliances, furniture and so on) and any other item which is customarily advertised.

The method of advertisement may be a rider on a "For Sale" sign, may be a line printed on a sign, may be a statement in a printed advertisement (classified newspaper advertisement, in-column directory advertisement, box advertisement, display advertisements, tabloid advertisements, billboard advertising, magazine advertisements, website or other Internet based advertisements and so on).

In a method embodiment of the invention, certain steps of use of the invention may be as follows: advertising an item for sale or lease by displaying a access number operative to receive a first communication from a cellular communication device, followed by actively seeking a first message made to such access number by a user and upon receipt of the first message from the user, routing the first message to a digital device able to respond to the first message (necessarily including recording the contact number of the cellular communication device to allow for a return message), at which point the digital device accesses a database of information concerning the sale item and sends to such cellular communication device contact number a first informational message containing the information brochure/text brochure/media brochure concerning the item while also sending a first alert message to a sales agent.

Summary in Reference to Claims

It is therefore a first aspect, advantage, objective and embodiment of the invention to provide a brochure distribution device for use with an item to be sold, leased or otherwise advertised, the device comprising:
  an advertisement of such item, the advertisement displaying thereon a access number, the access number operative to receive a first communication from a cellular communication device;
  a digital device having a first operative connection from the access number, the digital device having an active response system allowing immediate automatic response to connections from the access number;
  a first database of information concerning such item, the information concerning such item being operatively accessible to the digital device;
  a response module of the digital device, the response module able to receive a cellular communication device number during the first communication to the access number and in response, to send to the cellular communication device a first informational message containing the information concerning such item.

It is therefore a second advantage, objective and embodiment of the invention to provide a brochure distribution device, wherein the access number further comprises:
  one member selected from the group consisting of: a telephone number, a short code, a computer network address and combinations thereof.

It is therefore another aspect, advantage, objective and embodiment of the invention to provide a brochure distribution device, wherein the first operative connection to the digital device from the access number further comprises:
  one member selected from the group consisting of: a cellular telecommunication network, a telecommunication gateway device, a telecommunication first tier provider, a telecommunication service aggregator, a hunter line, a listener line, a VoIP connection, a computer network, a telecommunication network, and also combinations thereof.

It is therefore another aspect, advantage, objective and embodiment of the invention to provide a brochure distribution device, wherein the database of information concerning such item further comprises:
  one member selected from the group consisting of: textual information concerning such item, details of such item, short summaries of textual information and details of such item, images of the interior of such item, images of the exterior of such item, images of rear views of such item, legal details regarding such item, price of such item, financial options for purchase of such item, and combinations thereof.

It is therefore another aspect, advantage, objective and embodiment of the invention to provide a brochure distribution device, wherein the response module of the digital device further comprises:
  one member selected from the group consisting of: an interactive voice response system, an interactive DTMF code response system, a text message parser, a call center, and combinations thereof.

It is therefore another aspect, advantage, objective and embodiment of the invention to provide a brochure distribution device, wherein the first informational message further comprises:
  one member selected from the group consisting of: an SMS text message, an image, and combinations thereof.

It is therefore another aspect, advantage, objective and embodiment of the invention to provide a brochure distribution device, further comprising:
  a sales agent alert module, the alert module able to send a first alert message to a sales agent in response to receipt of a cellular communication device number during the first communication to the access number.

It is therefore another aspect, advantage, objective and embodiment of the invention to provide a brochure distribution device, wherein the first alert message further comprises:
  one member selected from the group consisting of: an SMS text message, a voice message, an e-mail, a facsimile message, a page, and combinations thereof.

It is therefore another aspect, advantage, objective and embodiment of the invention to provide a brochure distribution device, wherein the first alert message further comprises:
  the cellular communication device number.

It is therefore another aspect, advantage, objective and embodiment of the invention to provide a brochure distribution device, further comprising:

a second database of information concerning such first communication to the access number.

It is therefore another aspect, advantage, objective and embodiment of the invention to provide a brochure distribution device, wherein the first communication further comprises:

a telephone call from a POTS terminal, a telephone call from the cellular communication device, an SMS message, and combinations thereof.

It is therefore another aspect, advantage, objective and embodiment of the invention to provide a brochure distribution device, wherein the response module of the digital device is further able, in response to the first communication, to send a second informational message.

It is therefore another aspect, advantage, objective and embodiment of the invention to provide a brochure distribution device, wherein the response module of the digital device is further able, in response to the first communication, to send an opt in message.

It is therefore another aspect, advantage, objective and embodiment of the invention to provide a method of distributing information for an item, the method comprising the steps of:

a) advertising such item displaying a access number operative to receive a first communication from a cellular communication device;

b) actively seeking a first message made to such access number;

c) upon receipt of the first message, routing the first message to a digital device able to respond to the first message and recording the contact number of the cellular communication device;

d) accessing a database of information concerning such item;

e) sending to such cellular communication device contact number a first informational message containing the information concerning the item.

It is therefore yet another aspect, advantage, objective and embodiment of the invention to provide a method of distributing information for an item, wherein the database of information concerning such item further comprises:

one member selected from the group consisting of: textual information concerning such item, details of such item, short summaries of textual information and details of such item, images of the interior of such item, images of the exterior of such item, images of rear views of such item, legal details regarding such item, price of such item, financial options for purchase of such item, and combinations thereof.

It is therefore another aspect, advantage, objective and embodiment of the invention to provide a method of distributing information for an item, wherein the first informational message further comprises:

one member selected from the group consisting of: an SMS text message, an image, and combinations thereof.

It is therefore yet another aspect, advantage, objective and embodiment of the invention to provide a method of distributing information for an item, further comprising:

f) sending a first alert message to a sales agent in response to receipt of a cellular communication device number during the first communication to the access number.

It is therefore another aspect, advantage, objective and embodiment of the invention to provide a method of distributing information for an item, further comprising:

g) collecting and maintaining information concerning the first communication.

INDEX OF REFERENCE NUMERALS

Figure 1:
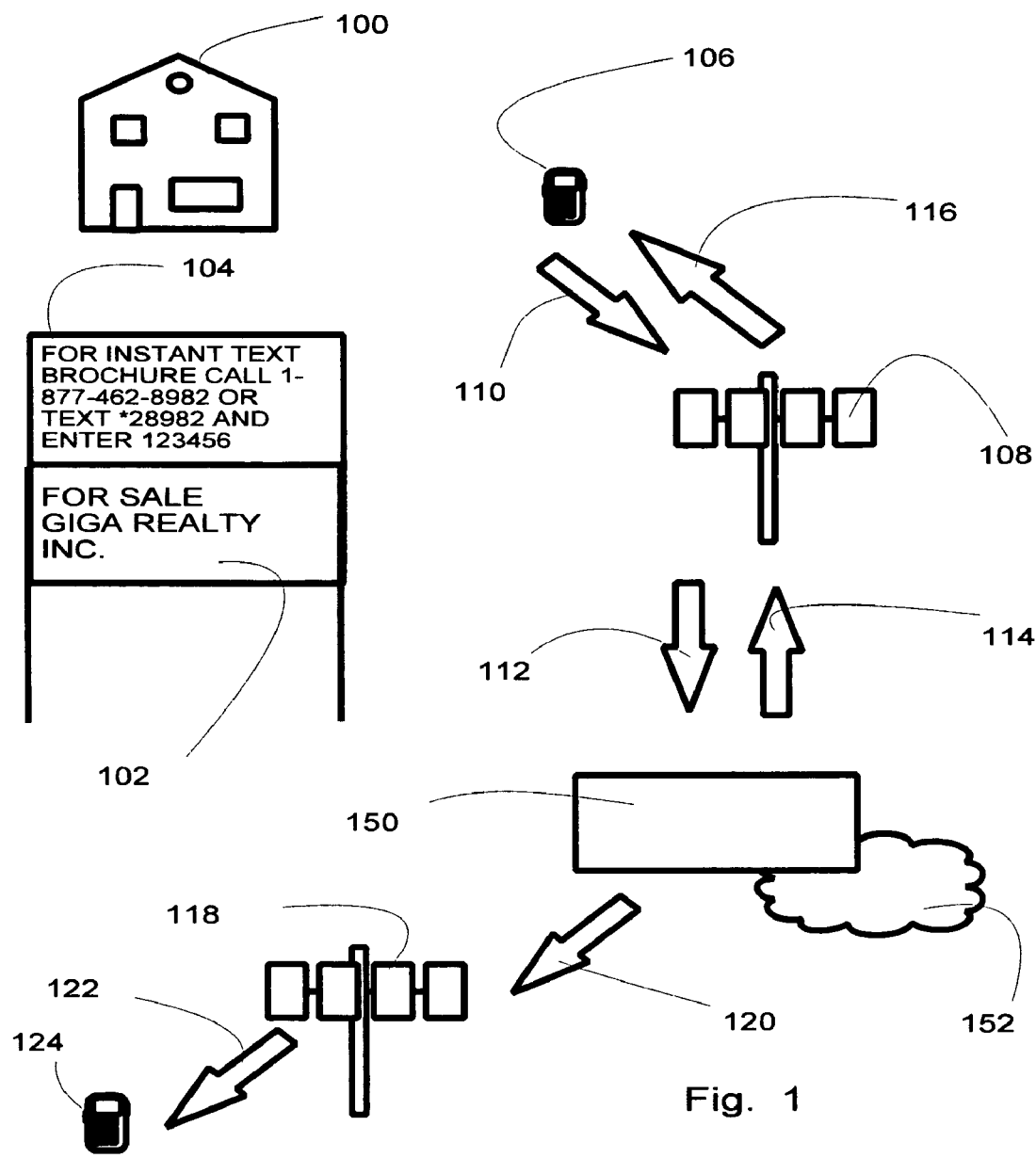
FIG. 1 is a block diagram of a first device embodiment of the invention having a generalized structure of the device.

Advertised item 100
Advertisement 102
Display of access number 104
Cellular communication device 106
Cellular communication system 108
First message (MO to system) 110
First message (to server) 112
Response message 114
Response message via cellular system (MT) 116
Generalized communication system 118
Alert message to agent 120
Alert message to agent via communication system 122
Agent communication terminal 124
Response server/digital device 150
Computer network/digital device 152
Cellular communication device 206
Cellular message 210
Alert message 222
Agent communication terminal 224
Active seek and response device 254
Telecommunication gateway 256
Telecommunication gatekeeper 257
Cellular message to message handler 258
Message handler 260
Connection to interactive response unit 262
Interactive response unit 264
Message (contact information) to script server 266
Scripting server 268
Message to database/advertiser server 270
Database/advertiser server 272
Message to cellular communication device 274
Cellular communication device 306
Cellular message 310
Alert message 322
Agent communication terminal 324
Active seek and response device 354
Telecommunication gateway 356
Telecommunication gatekeeper 357
Cellular message to message handler 358
Connection to interactive response unit 362
Interactive response unit 364
Message (contact information) to database server 366
Database/advertiser server 372
Message to cellular communication device 374
Placement of advertisement with access number 401
SMS message or call to access number 403
Process incoming SMS or call 405

Interactive voice response system, interactive DTMF code system, SMS message parser 407
Retrieve sale item data 409
Format SMS message or image 411
Send SMS message/image 413
Cell telephone 506
Carrier and SMS queue 550
Server 572
SMS text message, MO 580
Message to server 582
Message from server 586
SMS text message, MT 588

DETAILED DESCRIPTION

Figure 5:
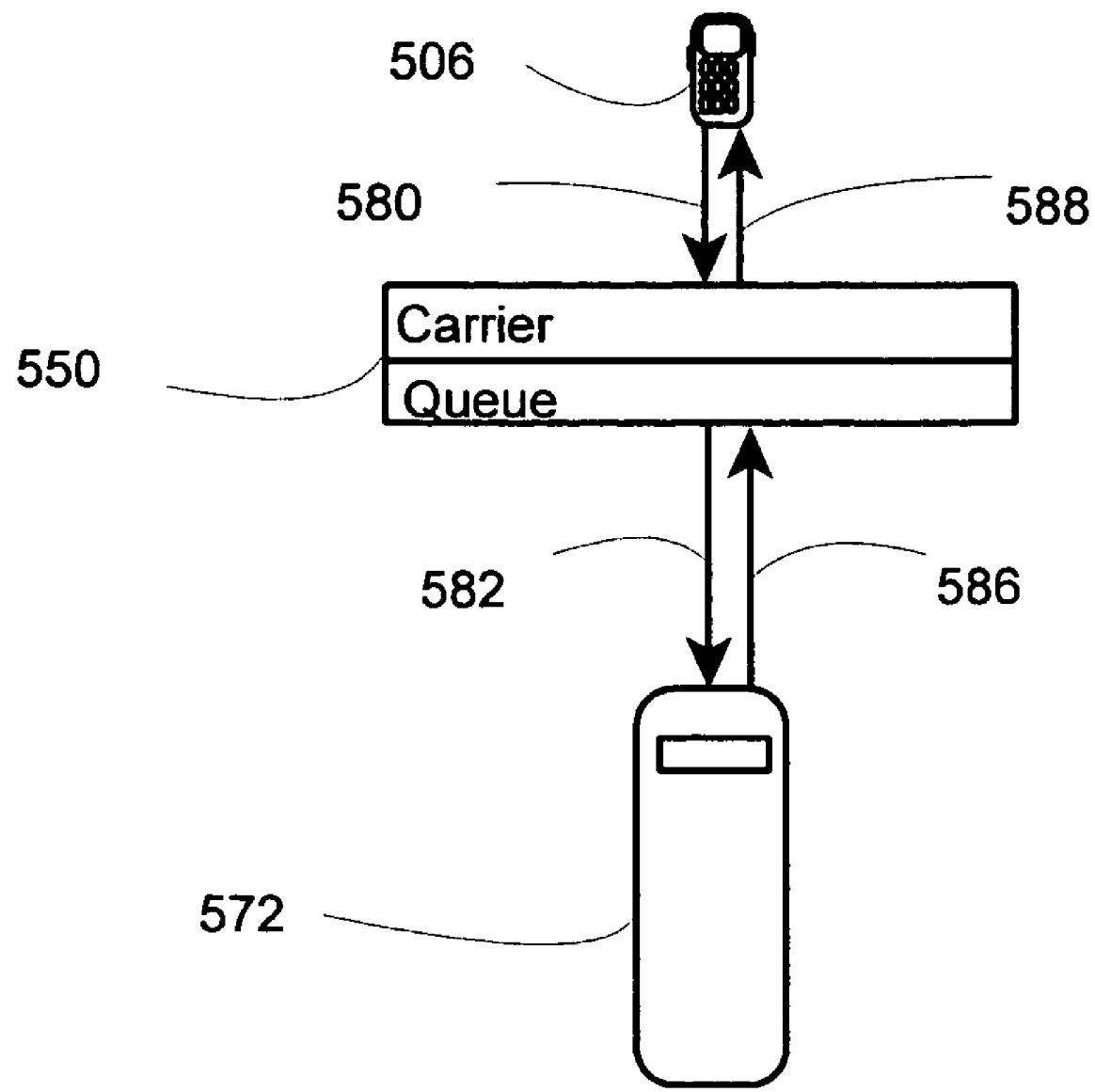
FIG. 5 is a block diagram of a PRIOR ART system according to earlier uses.

Details of the invention may be understood by reference to the earlier versions of the inventor. One such is shown in the prior art diagram FIG. 5. A user desiring to contact the system from a cell phone 506 will initiate an SMS text message only, which is sent to the cell telephone carrier. However the text message short code may be somewhat difficult to obtain for use by a number of different possible carriers who may be serving the user, and so the prior art version became difficult to implement for anyone but an aggregator, a tier one cell telephone carrier or the like. (The two implementations known are both carried out by aggregators.) However, the carrier 550 then handles the SMS text message in the standard fashion, that is, relegating it to a lower priority than concurrent voice traffic on the aggregator or carrier's bandwidth. Obviously, this may require the use of a queue to hold the SMS text message until it is convenient to deliver it via message 582 to the database server 572. Database server 572 as commonly contacted by aggregators and the like is a passive listening device which does not necessarily respond immediately to incoming message 582. In embodiments, the initiation of the response may actually require human intervention. In either case, database server 572 sooner or later generates return message 586 and sends it back, via carrier 550 and another potential wait in a queue, until SMS text message 588 is received by the user, after an interval which may range from negligible to a number hours. After the passage of a number of hours, the user as a "prospect" or "hot lead" has cooled considerably. It addition, it is worth noting the lack of active response by the server 572 and the limitation that users must enjoy text messaging, an activity common only among individuals under 30 years of age at the present time.

FIG. 1 is a block diagram of a first device embodiment of the invention having a generalized structure of the device.

Advertised item 100 is depicted as a single family dwelling such as a house, however, it may be a row house, town home, condominium, lot, commercial property, industrial property or any type of real estate. It may also be a vehicle such as a passenger car, RV, airplane, boat, trailer or the like, or it may be any item commonly bought and sold such as sporting goods, electronic equipment and so on. Note that the item for sale 100 need not actually be present: the device and method of the invention may be used with pure advertisements such as classified advertisements, yellow pages advertising, outdoor advertising, indoor signage and so on. In practice, the invention is most beneficial with items such as real estate in which the item for sale is itself the most important inducement to buy, and an interested party is likely to be standing looking at the item and desiring to see more of it: the interior, the back side, the details of cost and size and so on.

Advertisement 102 may thus not be limited to a yard sign having a rider thereon but may be any type of advertisement commonly used, even such forms as Internet advertising, search engine results, broadcast advertising over radio or television, cable advertising and so on.

As noted previously, in addition to sales, leasing or other transactions may be contemplated.

Display of access number 104 is an essential step in which the seller makes the buyer aware that an instant brochure exists and can be sent to a cellular enabled communication device such as cellular communication device 106. It will be appreciated that while at the present time WAPI enabled mobile telephones may be the most common implementation of cellular enabled communication devices, there are numerous other such devices. For example, WIFI hotspots, networks and gateways provide another type of cellular (each hotspot functions as a cell) communication for laptop computers and the like. Bluetooth enabled devices and hubs similarly function as small networks, and the range of Bluetooth enabled devices is quite wide. In general, due to the wide variety of the various types of cellular communication available in a wide variety of cellular communication systems such as cellular communication system 108, there may be PDAs, games, iPODs, and every conceivable type of electronic device now known or later developed which may be used with the system and method of the present invention.

The access number itself may take a number of forms. The access number may be a telephone number, which is operative to receive a telephone call from a cellular communication device, or it may be an address for a text message such as an e-mail address or a "short code" or the like.

An interested party may begin the process of the present invention and access the system of the present invention by means of first message 110, which begins as a fairly conventional (to the telecommunication system) message to the system initiating contact. The message is then passed along from the system as first message (to server) 112, a step which may require considerable additional processing or devices in order to function in a timely manner and in a manner acceptable to individuals who do not text message frequently. (These aspects will be discussed in greater detail in reference to FIGS. 2 and 3.) Such messages, if sent from a mobile device, may be referred to as MO or mobile originated, while messages to such devices are MT or mobile terminated messages.

By whatever channel and in whatever format, the first message is enabled to promptly reach response server and digital device 150 or computer network 152. This enablement may involve a number of steps. In particular, an operative connection of the desired type may be established by means of a voice telephone call via regular telecommunication channels such as PTSN or ADSL, SDSL, or leased line, or the operative connection may be made by means of VoIP (Voice over Internet Protocol), WIFI to WIMAX, by other packetized communications, by parsing of an SMS message or the like. It is anticipated that in embodiments a large number of entities not limited to aggregators, tier one telecommunications providers, specialty telecommunication service providers and the like may be involved in establishing this fast operative connection. Thus a wide universe of services, networks and communications protocols may be used, including but not limited to: a cellular telecommunication network, a telecommunication gateway device, a telecommunication first tier provider, a telecommunication service aggregator, a hunter line, a listener line, a VoIP connection, a computer network, a telecommunication network, and also combinations thereof. In each case, the objective is to establish the operative connection to the server and database unit 150/152.

This device may be either a server 150 or a network device such as a computer network 152 (and it thus depicted in FIG.

1 as either or both of a device and/or a network). Examples of a single server device would be a single server computer having one or processors, while examples of a computer network 152 may be either a physical and address based network such as the Internet or a virtual software network such as the MLS (Multiple Listing Service, customarily used to list real estate properties for sale) or IDX (Information Data Exchange). If using MLS, the agent may be forced to duplicate the information into the server at the time the service of the invention is set up, while if using IDX the data may be taken from the database, a known feature of the IDX format. However, use of the IDX requires the system to retain property codes from each and every item sold, a disadvantage as the property codes the user enters will quickly grow quite long: 7 and 8 digits and eventually more. Avoiding use of the IDX allows the property codes to be reused from property to property, thus allowing for a finite number of property codes. A network embodiment may also be an intranet, a dedicated network, or even a dedicated portal which is part of the telecommunication network 108.

The user may manually or automatically provide their own contact information to the digital device 150/152 at this point. Such information may be collected automatically (for example via CID systems ("caller ID"), CWID or the like, or the user may be asked to provide the information. Consumer resistance to providing the information may be lowered by the fact that the user desires the text brochure or they would not be calling in the first place. In addition, asking for the information allows the user to specify a different contact number which may be more convenient for them.

It is necessary to identify the advertised item, as it is anticipated that large numbers of items may be advertised using this system. In embodiments, the merely selection of the access number may be directly linked to the property advertised: the item may be the only property advertised under that access number. Thus a single "short code" might be dedicated to a single item. However, in other embodiments, a single number may be called or messaged to, along with an identification of the item which is provided in the advertisement. In such embodiments, the database of information about the item (which may be as simple as a single entry) becomes a database having multiple entries, at least one for each item. In more complex embodiments, each item may in fact have numerous entries, including but not limited to: textual information concerning such item, details of such item, short summaries of textual information and details of such item, images of the interior of such item, images of the exterior of such item, images of rear views of such item, legal details regarding such item, price of such item, financial options for purchase of such item, and combinations thereof.

Thereafter, response message 114 may be quickly generated and formatted by the digital device 150/152 and sent back towards the user at cellular communication device 106 via cellular network 108 and response message via cellular system 116. Obviously, this message may take the form of a text message offering details of the item for sale, however, the message may also be an image of the item (MMS), a link to an image of the item (WAP), an offer to the user to receive similar text brochures on similar properties for lease/sale/transfer and so on. In the presently preferred embodiment and best mode presently contemplated for carrying out the invention, a sequence of at least three messages is actually sent. The first message may be a compact SMS text format message offering details of the advertised item, while the second message may be photographs, WAP links to photographs, showing visually further details of the advertised item, a short video, audio messages and so on. A third message may be an "opt in" message (or an "opt out" message, depending on market considerations, telecommunication standards and regulations and so on) allowing the user to receive additional information on similar advertised items.

Numerous modules to the digital device may thus be envisioned, with overlapping or redundant structures: a module for receipt of first (inquiry) messages, a response module, a database module, an agent alert module, data collection modules, a second prospect database collecting and maintaining information on contacts, and so on. These modules may be part of the digital device 150/152 and/or may be operatively accessible to it however, this is a distinction virtually without a difference in modern IT methods.

The item for sale may also be a wager such as a bet on the outcome of a race: when the user places the bet, the return response for WAP enabled technology includes not only the text brochure response but also a media version of the basis of the wager, such as a short video of the outcome of the race, a final score, an audio or video presentation of the event and so on.

Generalized communication system 118 is depicted as another cellular telecommunication system, but it may in fact be a PSTN/POTS (plain old telephone system) offering voice and facsimile messaging, the Internet, or another conventional communication system. Using this system, an alert message to agent 120 is sent: this message notifies the agent that an interested party has requested the text brochure on the advertised item. Alert message to agent via communication system 122 arrives at agent communication terminal 124, which may be a cellular communication device as discussed previously, a POTS telephone, a facsimile machine, an e-mail and so on.

By this means, the agent may be very promptly made aware of the fact that they have a "hot" lead: an individual actually viewing the advertisement or the advertised item, while the user may very promptly receive a text brochure about the advertised item.

Figure 2:
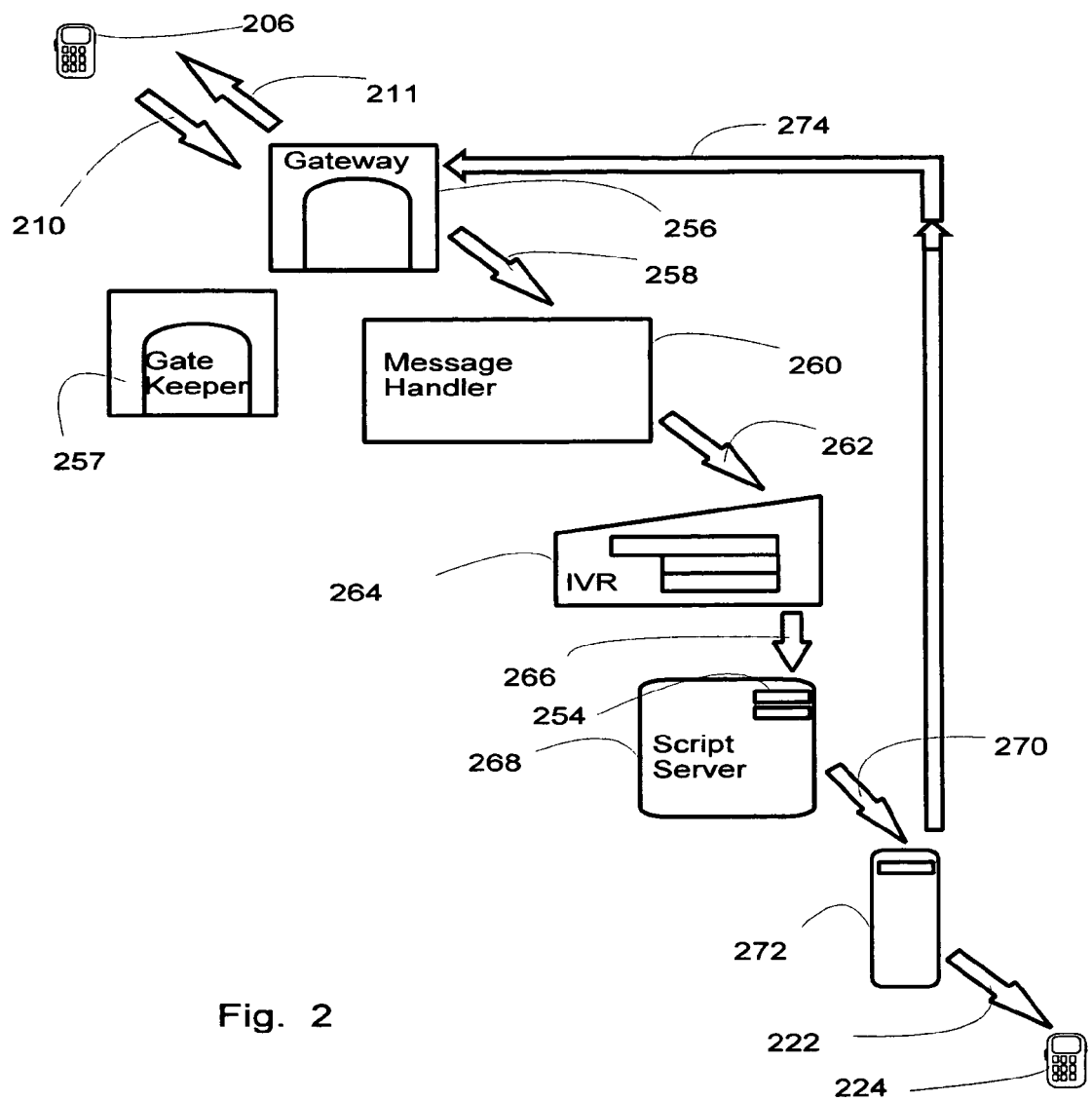
FIG. 2 is a block diagram of a second device embodiment of the invention, showing details of an active and timely active response system.

FIG. 2 is a block diagram of a second device embodiment of the invention, showing details of an active and timely active response system.

Cellular communication device 206 creates the first message as cellular message 210 which enters the domain of the communication system, comprising numerous systems and services itself.

Telecommunication gateway 256 may be a tier one service, an aggregator, reseller or the like, or may simply be considered to the be system or any component thereof: a gateway/switch and so on. Telecommunication gatekeeper 257 may be a backup system to the telecommunication gateway 256, which uses a different form of communication.

Note that backup systems of communication may be useful in cases in which the user's cell telephone carrier is not "signed on" with the premium service to allow free text messaging to the contact number. It may then be possible for the user to contact the system by the secondary route of communication.

Cellular message to message handler 258 passes through the cellular system to message handler 260 where the message is placed into a form, format or channel of communication 262 to achieve prompt passage through the system to the server/s at which it may be processed. Telecommunication gatekeeper 257 may use a different form, format or channel. For example, in one presently preferred embodiment of the invention, the first channel of communication may be VoIP connections to the IVR 264, allowing inexpensive worldwide communication. Telecommunication gatekeeper 257 may on the other hand use a traditional PTSN connection. The range of possibilities for the gateway and/or gatekeeper include but are not limited to PTSN, VoIP, WIFI to WIMAX, and other formats now know as well as those later developed. This speedy connection allows interactive voice or DTMF code (Dual Tone Signals) recognition by the system, allows quick response to SMS messages and so on. In systems relying upon an SMS message from the user via the gateway to the database server, the message suffers from being queued up until bandwidth becomes available, as the message is a lower priority than voice communications. In known systems this defect is not presently overcome, as a passive system merely waits for the http transaction to be registered before beginning any activities. In some systems, human intervention and action may be necessary in order to effectuate the receipt and response. On the other hand, in the present invention, an "active listening" or "active receiving" or "active response" system is used to provide for an immediate response.

In early testing, these active seeking and message handling functions additionally involved use of a telecommunications provider able to provide not just bandwidth service but also short codes and the like for access, then use of a main switch and changing the incoming communication to VoIP protocol for transfer to another nation and handling by another tier one telecommunication service there, all to get to the interactive response system 264. This system actually allowed prompt response to the user and necessitated no long distance or toll charges. In systems in which a non-premium messaging system could be used and with devices which did not require a separate fee for the incoming response messages, the consumer/user may pay no toll or fee of any type for the service. In other embodiments, the user might pay the standard fee for a message or other tolls, however, as early testing revealed, the system could be run on the basis of free brochures with costs borne by the customer/seller/agent. Later embodiments have simplified this message handling system.

In one embodiment which has passed testing, the user makes a telephone call to a first telephone number seen on the advertisement. The telephone number contacted and the BTN or bill to number may not necessarily be the same number, in the same area code, or in remotely the same location: a physical switch may be provided by a first provider (for example a tier one provider such as LEVEL 3 (R) Communication Corp.) while the access/service to the system may be provided by a service such as CENTRIC VOICE (R). In this example, the physical switch was located in New York while the numbers called were located in Texas. Such calls may also roll over to a toll free number if necessary, as a form of redundant back up channel.

From these two channels, the gateway/switch (landline via tier one provider) may be provided an IP address by an IVR service such as ANSWERS GROUP (TM). However, the backdoor or gatekeeper may provide an IP address directly from the aggregator, providing a second or redundant back up communication mode. By either route, the system may then reach the IVR gatekeeper, a service such as (in the tested embodiment under discussion) MacFarlane TeleSystems Ltd (TM) of London. This service may actually provide the physical IVR system 264 and provides running thereof. Software typically used on such an IVR system may include software from vendors such as SCANSOFT (R) (now NUANCE (TM)). In either case, the IVR system may then either initiate an http transaction itself or use a translation server or script server (268) which provides the actual http transaction (message) 270.

While the tested and claimed embodiment actually has considerably more structure and steps than the previous inventions in the field, it is able to provide an MO message with access to the IVR in mere seconds.

Interactive response system 264 may be an interactive voice response system, an interactive DTMF code response system, a text message parser, a call center, and combinations thereof. Obviously, the degree of "interactiveness" for a message parser is somewhat limited, and requires the user to engage in text messaging. This is acceptable with younger demographics, but for older users is not acceptable. Thus, the best mode now contemplated and presently preferred embodiments utilize an interactive voice or DTMF response system.

In use in a voice system, a user may be prompted with messages such as:

"Welcome to the mobile text brochure system."

"Please speak or enter the number of the property you are interested in."

"Please speak or enter the number to which text brochures should be sent."

"Would you like to schedule a showing?"

The information may include disclaimers, error messages, a mandatory requirement or offer that the user opt in to the receipt of the message, information that further charges may apply, and so on. The user may be offered a script such as that of Table One.

TABLE ONE

1. Welcome to U2TXT Text Brochures, for English press (1)
   a.   (If 1 go to step 2)
   b.   For Spanish press two (2) (script recorded in Spanish)
   (Go to the Spanish language script step 2)
   c. For French press three (3) (script recorded in French)
   (Go to the French language script step 2)
   d. If the IVR system is down go to step 9
2. U2TXT users may receive up to 3 text messages on this property at standard text messaging rates and other charges may apply to receiving any photos. If you want to continue, say yes. If you want to exit, say no.
   a.   If yes, go to 3
   b.   If no, go to 7
3. Please say the six digit number from the sign rider
        (The number is then repeated back to the caller)
4. Is this the correct code, say yes or no?
   (If yes the recording continues at 5)
   (If no, the recording says)
4a. Please enter the six digit code using your keypad
        (The number is then repeated back to the caller)
4b. Is this the correct code, say yes or no?
     If yes, the recording continues at 5
     If no, the recording repeats 4a again
     After 2 failed attempts the recording continues at 8
5. Are you calling from a cell phone, say yes or no?
5a. If yes go to 6
5b. If no, go to 6a
6. Do you want the Text Brochure sent to this cell phone number?
   Say yes or no
   (If yes the recording continues at 7)
   (If no, the recording says)
6a. Please enter a cell phone number starting with 1, your area code, and the 7 digit number.
6b. Is this the correct number, say yes or no?
   If no, the recording repeats 6a again
   After 2 failed attempts the recording continues at 8
7. U2TXT thanks you for using Text Brochures. Any requested Text Brochures have been sent. (End of all)
8. I'm sorry; I could not understand what you said. Please try again later. (End of call)
9. I'm sorry we cannot complete your request right now; please contact U2TXT Customer Service at 1-888-448-2898 for further details. (End of call)

END OF TABLE ONE

Thereafter, the message (containing contact information) 266 may direct the scripting server 268 to prepare a message to database/advertiser server 270. This message may be an http transaction via short code text in embodiments now used, but may be in other "fast" formats now known or later devised. Database/advertiser server 272 receives message 270 and on the basis of the information therein prepares response message to cellular communication device 274. The MT response message 274 will obviously travel back from the server 272 to the gateway or carrier 256 without need of the IVR, and thence via text message, MMS format, WAP enabled links or the like to the mobile terminal 206. This step may require queuing in embodiments, however, in embodiments carrier queuing is not necessary and the response message may arrive in mere seconds after user termination of the initial telephone call to the IVR.

The longest single step in this process may be the IVR system usage, when the user interactively offers the IVR system contact information, opts in for receipt of the messages, indicates the property of interest and so on. This step has been tested to take between one and two minutes in normal cases.

The significant features of the active response system occur at database server 272. Note that in embodiments using voice communications, this active seeking may not be necessary, however, in systems which use an SMS format first message, this active seeking is necessary to achieve the timely response to the first message.

Alert message 222 may also be sent to agent communication terminal 224.

Aspects of the system may be combined: it is not necessary for the system to be "split up" into as many different providers and services as are shown except for regulatory reasons and reason of industrial structure.

Figure 3:
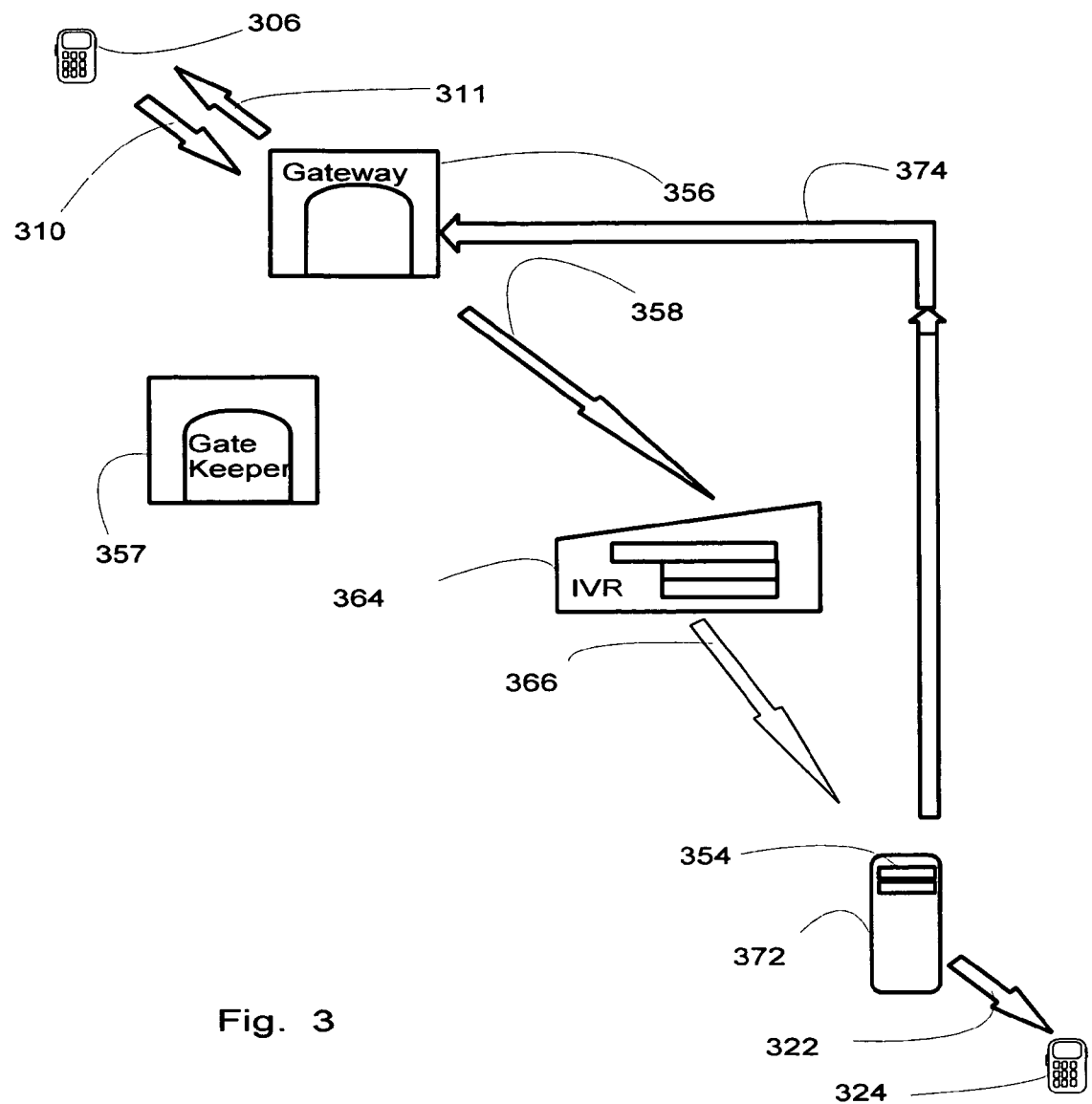
FIG. 3 is a block diagram of a third device embodiment of the invention, showing a simplified active response system.

FIG. 3 is a block diagram of a third device embodiment of the invention, showing a simplified active response system. Cellular communication device 306, cellular message 310, alert message 322, and agent communication terminal 324 may be much as described previously.

Active seek and response device 354 is somewhat simplified, comprising telecommunication gateway 356, cellular message to message handler 358 and message handler 360, which may be greatly simplified to reduce the total number of steps required by the processing. Connection to interactive response unit 362 and interactive response unit 364 may be much as previously described with the user generating DTMF codes by pushing telephone buttons or simply speaking into the telephone to provide the actual message content (identity of the item, contact number of the user). Message (contact information) to database server 366 may bypass a special scripting server, instead database/advertiser server 372 may directly accept the information from the IVR unit 362 and access the database, generate the response message, and send the message to cellular communication device 374.

Figure 4:
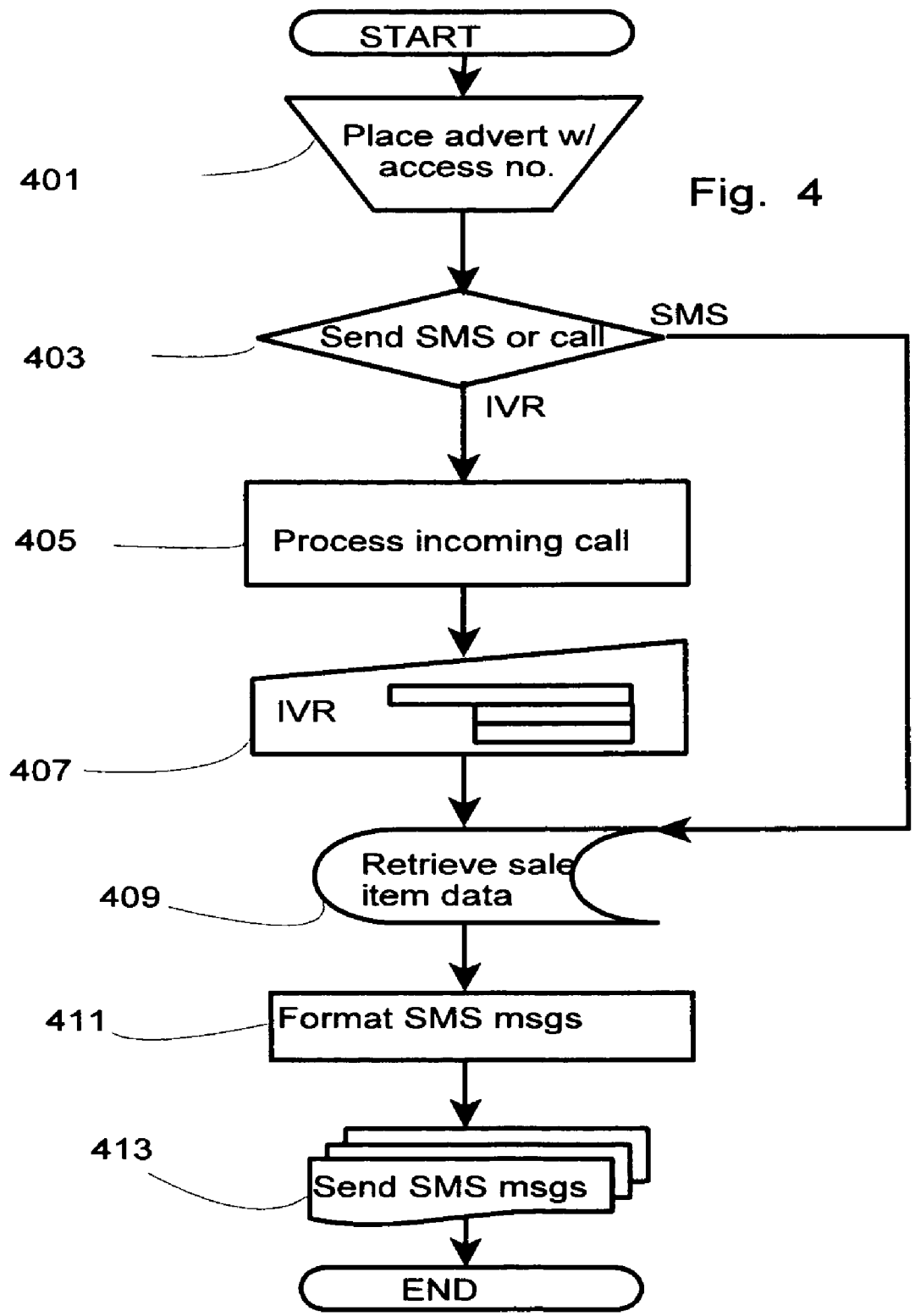
FIG. 4 is a flow chart of a fourth method embodiment of the invention showing a basic structure of the steps of the method.

FIG. 4 is a flow chart of a fourth method embodiment of the invention showing a basic structure of the steps of the method.

Placement of advertisement with access number (step 401) provides for advertising such item displaying a access number operative to receive a first communication from a cellular communication device as discusses in reference to the system/device embodiments of the invention. This is a manual step under certain circumstances.

SMS message or call to access number (step 403) is a choice/data entry step by the user, involving informing the telecommunication network of the access number, then informing the digital device (150/152 of FIG. 1) of the identity of the item and the contact number of the user, that is, the first message. If the user selects the SMS option, the SMS message goes to the server for retrieval of the information via the active response system of the server, based upon the http transaction of the communication system/gateway.

However, if the user elects to telephone the IVR system for voice processing, then a different communication path is followed. Process incoming SMS or call (step 405) involves the receipt of the first message made to such access number as well as routing the first message to a digital device able to respond to the first message and recording the contact number of the cellular communication device (see step 407, interactive voice response system, interactive DTMF code system, SMS message parser).

Retrieval of the sale item data at step 409 requires accessing the database of information concerning such item, this database may be part of the same digital device as the response units or may be separate: as previously noted, the invention may be carried out in a distributed manner, or using modules of a single device, or by intercommunicating modules of a network and so on. The database may be the MLS system, for example using the IDX (Information Data Exchange protocol).

The message is then formatted properly for the cellular communication device (step 411). Note that this format may be any format now known or later developed which allows communication to such a device: an SMS format, MMS image formats, video, audio, WAP link formats, and so on. The first informational message is then sent (step 413) to the cellular communication device contact number: additional messages may follow.

Additional steps include the sending of a first alert message to a sales agent, and/or collecting and maintaining information concerning the first communication.

Yet later steps may ask the user to access some other service such as a website or the interactive voice/DTMF system and further "opt in" or register for further information. The user may then be asked if they would like to be contacted by the sales agent, may be asked for further demographic information, schedule showings of the item, and so on. Such later processes may occur via Internet, via e-mail, voice, person to person contact and the like.

The disclosure is provided to allow practice of the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the appended claims.

What is claimed is:

1. A brochure distribution device for use with an item to be sold, the device comprising:
   an advertisement of such item, the advertisement displaying thereon an access number, the access number operative to receive a first communication from a cellular communication device;
   a first database containing information concerning such item, such information selected from the group consisting of: text descriptions of such item, images of such item, video clips of such item, and combinations thereof; and
   a digital device comprising:
      a first operative connection from the access number;
      an active response system allowing immediate automatic response to connections from the access number, regardless of the message format, without prioritizing such communication based on a message format of the cellular communication device; and a response module able to receive, during the first communication to the access number, a designated cellular communication device number for responding to the first communication and, in response, to retrieve information from the database and send, as a second communication, an SMS-formatted brochure containing the information concerning such item to the designated cellular communication device, with the brochure formatted for receipt and display by the designated cellular communication device;

wherein the SMS format of such brochure is capable of including links, text about the item, images of the item, and video clips of the item.

2. The brochure distribution device of claim 1, wherein the access number further comprises:

one member selected from the group consisting of: a telephone number, a short code, a computer network address and combinations thereof.

3. The brochure distribution device of claim 1, wherein the first operative connection to the digital device from the access number further comprises:

one member selected from the group consisting of: a cellular telecommunication network, a telecommunication gateway device, a telecommunication first tier provider, a telecommunication service aggregator, a hunter line, a listener line, a VOIP connection, a computer network, a telecommunication network, and also combinations thereof.

4. The brochure distribution device of claim 1, wherein the database of information concerning such item further comprises:

one member selected from the group consisting of: property type, location, size, lot size of real estate, rooms within buildings, textual information concerning such item details of such item, short summaries of textual information and details of such item, images of the interior of such item, images of the exterior of such item, images of rear views of such item, legal details regarding such item, and combinations thereof.

5. The brochure distribution device of claim 1, wherein the active response system of the digital device further comprises:

one member selected from the group consisting of: an interactive voice response system, an interactive DTMF code response system, a text message parser, and combination thereof.

6. The brochure distribution device of claim 1, further comprising:

a sales agent alert module, the alert module able to send a first alert message to a sales agent in response to receipt of a cellular communication device number during the first communication to the access number.

7. The brochure distribution device of claim 6, wherein the first alert message further comprises:

one member selected from the group consisting of: an SMS text message, a voice message, an e-mail, a facsimile message, a page, and combinations thereof.

8. The brochure distribution device of claim 6, wherein the first alert message further comprises:

the cellular communication device number.

9. The brochure distribution device of claim 1, further comprising:

a second database of information concerning such first communication to the access number.

10. The brochure distribution device of claim 1, wherein the first communication further comprises:

an SMS message.

11. The brochure distribution device of claim 1, wherein the response module of the digital device is further able, in response to the first communication, to send a second informational message.

12. The brochure distribution device of claim 1, wherein the response module of the digital device is further able, in response to the first communication, to send an opt in message.

13. A method of distributing information for an item, the method comprising the steps of:

a) advertising such item displaying an access number operative to receive a first communication from a cellular communication device;

b) actively seeking a first message made to such access number;

c) upon receipt of the first message, routing, without prioritizing such message based on a message format of the cellular communication device, the first message to a digital device able to respond to the first message and recording the contact number of the cellular communication device;

d) accessing a database of information concerning such item, such information selected from the group consisting of: text descriptions of such item, images of such item, video clips of such item, and combinations thereof;

e) sending to such cellular communication device contact number an additional communication in the form of an SMS-formatted brochure containing the information concerning such item, the SMS format capable of including links, text about the item, images of the item, and video clips of the item and formatted for receipt and display by the designated cellular communication device.

14. The method of distributing information for an item of claim 13, wherein the database of information concerning such item further comprises:

one member selected from the group consisting of: textual information concerning such item, details of such item, short summaries of textual information and details of such item, images of the interior of such item, images of the exterior of such item, images of rear views of such item, legal details regarding such item, advertisements, outcomes of events, and combinations thereof.

15. The method of distributing information for an item of claim 13, wherein the SMS format brochure further comprises:

one member selected from the group consisting of: text, an image, and combinations thereof.

16. The method of distributing information for an item of claim 13, further comprising:

f) sending a first alert message to a sales agent in response to receipt of a cellular communication device number during the first communication to the access number.

17. The method of distributing information for an item of claim 13, further comprising:

g) collecting and maintaining information concerning the first communication.

* * * * *